United States Patent [19]
Ball et al.

[11] Patent Number: 5,610,386
[45] Date of Patent: Mar. 11, 1997

[54] PORTABLE OPTICAL SCANNING SYSTEM INCLUDING RING HAVING BREAKAWAY ELEMENT

[75] Inventors: Alan Ball, Arlington; David Honan, Concord, both of Mass.; Peter Wyatt, Portland, Oreg.; Michael Daley, Plano, Tex.; Philip W. Swift, Port Jefferson, N.Y.

[73] Assignee: Symbol Technologies, Inc., Holtsville, N.Y.

[21] Appl. No.: 502,966

[22] Filed: Jul. 17, 1995

[51] Int. Cl.⁶ .................................................. G06K 7/10
[52] U.S. Cl. .......................................... 235/472; 235/462
[58] Field of Search ..................................... 235/472, 462

[56] References Cited

U.S. PATENT DOCUMENTS

| | | | |
|---|---|---|---|
| 4,766,299 | 8/1988 | Tierney | 235/472 |
| 5,191,197 | 3/1993 | Metlitsky | 235/472 |
| 5,305,181 | 4/1994 | Schultz | 235/472 X |
| 5,340,972 | 8/1994 | Sandor | 235/472 |
| 5,410,140 | 4/1995 | Bard et al. | 235/462 |

*Primary Examiner*—Harold Pitts
*Attorney, Agent, or Firm*—Kirschstein, et al.

[57] ABSTRACT

A portable optical scanning system incorporates a ring mounted optical scanner module which is arranged to transmit data either via radio or cable to a wrist mount unit. The wrist mount unit may either receive and store the information, or it may include a radio transmitter for onward transmission of the data. A variety of different rings, ring mounted scanner modules, wrist mounts and wrist mount units may be provided for various applications, the user simply picking those which are required in any individual case. The scanner module is mounted to the ring by a breakaway element allowing the module easily to break off the mounting to prevent damage and/or injury.

27 Claims, 3 Drawing Sheets

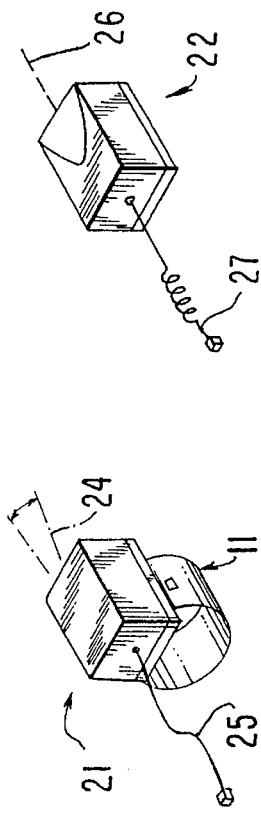
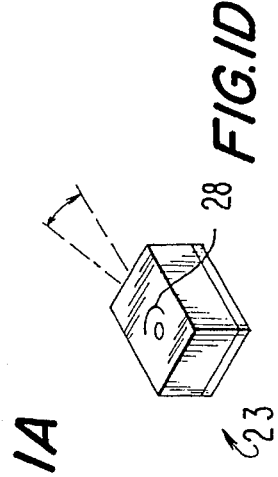
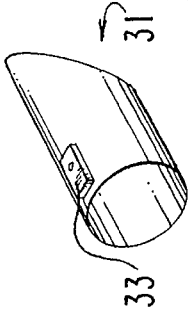
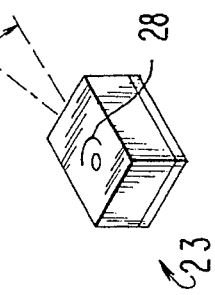
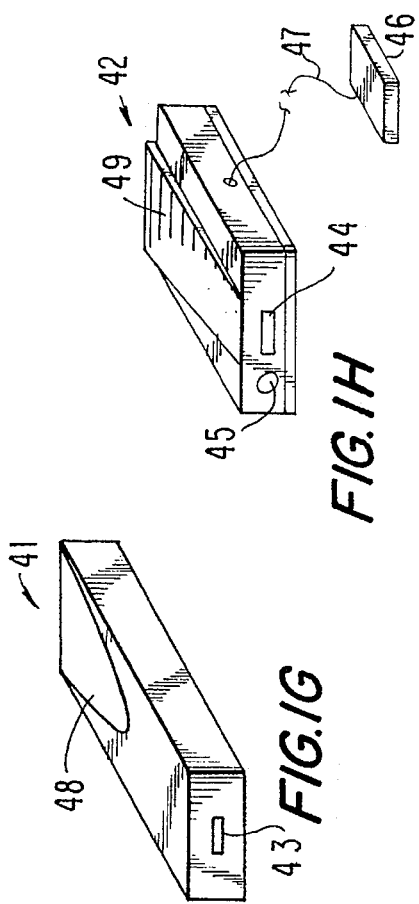
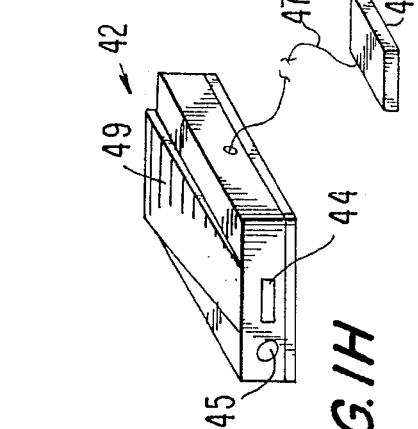
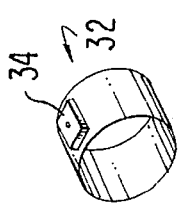

PORTABLE OPTICAL SCANNING SYSTEM INCLUDING RING HAVING BREAKAWAY ELEMENT

CROSS REFERENCE TO RELATED APPLICATIONS

This application is related to U.S. Ser. No. 08/294,845, filed Aug. 29, 1994, now pending; U.S. Ser. No. 08/068,025, filed May 28, 1993, now pending; U.S. Ser. No. 08/228,172, filed Apr. 15, 1994, now pending; U.S. Ser. No. 07/884,734, filed May 15, 1992, now abandoned; U.S. Ser. No. 08/246,382, filed May 20, 1994, now U.S. Pat. No. 5,410,140, which is a continuation of U.S. Ser. No. 08/073,995, filed Jun. 9, 1993, now abandoned, which is a continuation of U.S. Ser. No. 07/787,458, filed Nov. 4, 1991, now abandoned.

BACKGROUND OF THE INVENTION

1. Field of the Invention:

The invention relates to portable optical scanners for reading indicia of varying light intensity, and in particular to such scanners which are adapted to be worn on the person.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

It has previously been proposed to provide a small portable scanner attached to a ring which is worn on a finger of the user. To operate the scanner, the user merely points the appropriate finger in the direction required so that the scanning beam scans across the indicia to be read. One difficulty with such an arrangement is that where the operator is engaged in a variety of tasks, only one of which is the scanning of bar codes, it may be inconvenient for the ring repeatedly to have to be put on and taken off again. Also, if the user accidentally knocks the scanner module, or twists it, the ring and/or module might be damaged.

OBJECTS OF THE INVENTION

It is an object of the invention at least to alleviate the problems of the prior art.

It is a further object to provide a convenient to use portable optical scanner.

It is a further object to provide a portable optical scanning system which may be used in a variety of different circumstances, and for a variety of different applications, thereby avoiding the necessity for a user to have to purchase several entirely different systems for different applications.

It is a further object of the invention to improve the safety of portable optical scanners.

SUMMARY OF THE INVENTION

According to a first aspect of the present invention there is provided an optical scanner comprising a ring having a band arranged to be worn on a finger of a user, and a scanner module releasably mounted to the ring by a breakaway element, the breakaway element being arranged to release the scanner module from the ring in the event of a force being applied to the module which might otherwise injure the user.

The breakaway element allows the scanner module to be broken away or easily removed from the ring. This provides not only for easy operator-replacement of the scanner module, without needing to remove the ring, but also acts as a safety feature: the scanner module breaks away from the ring if an unusual force is applied, thereby avoiding accidental damage to the scanner module and/or injury to the user.

According to a second aspect of the invention there is provided a portable optical scanning system comprising:

(a) a ring having a band arranged to be worn on a finger of a user;

(b) a scanner module releasably mounted to the ring by a breakaway element and arranged to output signals representative of light received from an indicia to be scanned; and (c) a wrist-mounted unit for receiving the signals from the scanner module.

The scanner module may transmit data to the wrist-mounted unit either via an intermediate cable or, alternatively, via a radio transmitter. The wrist-mounted unit itself may incorporate a radio transmitter for further onward transmission of the data to a remote receiving station.

According to a third aspect of the invention there is provided a portable optical scanning system comprising:

(a) a plurality of rings arranged to be worn on the finger of a user;

(b) a plurality of different scanner modules, each of which is attachable to a chosen one of the rings via a breakaway element, and each of which is arranged to output signals representative of light received from an indicia to be scanned; and (c) a plurality of different wrist-mounted units for receiving the signals from a chosen one of the scanner modules.

Such an arrangement allows the user to pick the scanner module and the wrist module to match the application. In a preferred embodiment, there is also provided a plurality of individual wrist mounts, and a plurality of individual rings, from which the user may also choose. The wrist mounts and/or rings may be of differing sizes so that the user may choose an appropriate size for him or herself, thereby ensuring comfort whatever scanning module and wrist-mounted module is to be used. Several rings and/or several wrist-mounts of the same size may be provided so that individual users may retain their own. During the working day, the users may wear their own rings and/or wrist mounts at all times, simply selecting and securing to them appropriate scanner modules and wrist-mounted modules as and when they are required. This avoids the need for individually sized mountings on the scanner modules and on the wrist-mounted modules, thereby saving inventory costs. Time may also be saved in that the users do not need to spend time adjusting the size of the mount whenever they need to pick up and put on a new scanner module or wrist-mounted module.

In one arrangement, the scanning modules and the wrist-mounted units are shared by several different users, while the rings and the wrist-mounts are unique and are sized to the finger and wrist of specific users. This allows the user to have a comfortable ring and wrist mount without the necessity of trying on different sizes whenever the scanner module and/or wrist mounted unit is to be changed. The use of a personal ring and wrist mount also provides personal hygiene advantages.

DESCRIPTION OF THE DRAWINGS

The invention may be carried into practice in a numbers of ways and several specific embodiments will now be described, by way of example, with reference to the accompanying drawings, in which:

FIGS. 1A–1H show an assembly of devices making up a portable optical scanning system according to a preferred embodiment of the present invention;

DETAILED DESCRIPTION OF THE PREFERRED EMBODIMENTS

Figure 2:
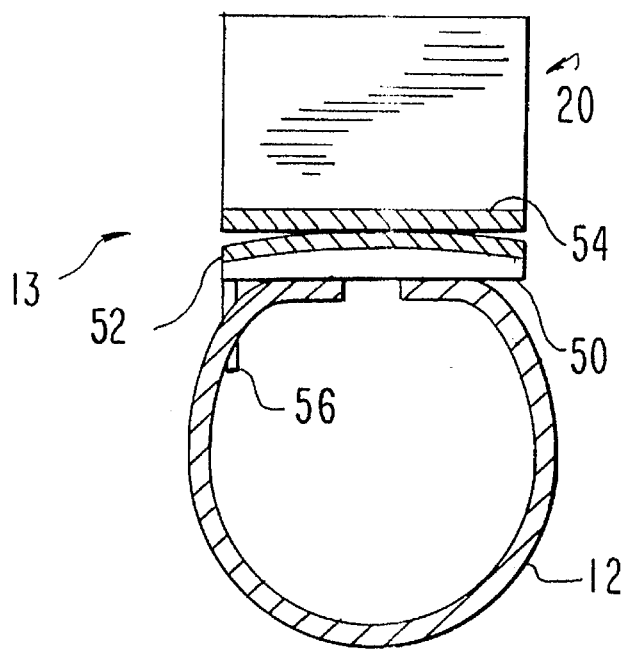
FIG. 2 illustrates the ring mount in more detail, and shows the breakaway element feature.

The preferred portable optical scanning system of the present invention is shown in FIG. 1. The system as a whole comprises four separate elements, examples of which are shown opposite the numerals 10, 20, 30, 40 respectively. The individual elements, described generically, are a ring 10, adapted to be worn on the finger of a user; a scanner module 20 for mounting on the ring; a wrist band 30; and a wrist mount unit 40 for mounting on the band 30. There may be several varieties of each type of element available, from which the user may pick and choose, according to his or her preference and/or the scanning application in question. Once the appropriate elements have been chosen, the user slides the ring 10 onto a finger, and the wrist mount 30 onto the wrist. The chosen scanner module 20 is then secured to the ring, and the chosen wrist mount unit 40 secured to the wrist mount.

In use, the user simply points the finger carrying the ring 10 in the direction of an indicia to be scanned. The scanner module 20 provides a fixed or scanning laser beam which scans across the indicia. Light reflected from the indicia is received by the scanner in the usual way, and is detected. A signal is then passed from the scanner module 20 to the wrist mount unit 40 for onward transmission and/or storage and analysis.

Turning now to FIG. 1A in more detail, it will be seen that the preferred ring mounting 11 comprises a ring band 12 and a mounting element 13 for releasably mounting the scanner module. The band 12 may come in various sizes, so that a user simply picks one of the appropriate size, or alternatively it may be adjustable in size. The side of the ring includes a micro switch 14 for turning the scanner module on and off.

The scanner module 20 may come in various varieties, shown schematically at 21, 22 and 23. For clarity, the module 21 in FIG. 1B is shown with the ring mounting 11 already attached. The scanner module 21 incorporates a miniature scanner including a source of light such as a laser beam and a scanning mechanism for scanning the resultant beam 24. Detection optics are also provided within the module to detect light which has been reflected from the indicia being read. The module generates electrical signals representative of the reflected light, these being passed on to the appropriate wrist mount unit 40 via a cable 25. An alternative embodiment is shown in FIG. 1C schematically at 22. Here, the module has no scanning element, and is arranged simply to provide a fixed laser beam 26. In order to cause the fixed beam 26 to scan across an indicia to be read, the user manually moves the hand on which the ring is mounted. As before, reflected light from the indicia is detected by the unit, and signals are passed on along a lead 27. Yet a further embodiment is shown in FIG. 1C at 23: this corresponds generally to the embodiment 21 that includes a radio transmitter 28 rather than a lead 25 for transmitting data to the wrist mount unit 40.

The wrist mount 30 may be provided in a variety of styles, for example as shown at 31 and 32 in FIGS 1E and 1F. Wrist mounts of various sizes may be provided, for different users, or alternatively the mounts may be adjustable in size. The wrist mounts include mountings 33,34 for securing in place the wrist mount unit 40.

The wrist mount unit 40 may itself be provided in various versions, for example those shown at 41 and 42 in FIGS. 1G and 1H. The unit 41 includes a socket 43 for receiving a cable 25,27 from the scanner module 20. It also includes a radio transmitter 48 for transmitting data to a remote unit (not shown). An alternative version 42 is arranged to receive signals from the scanner module either by means of a lead, plugged into a socket 44, or alternatively via a radio receiver 45. The radio receiver is of course for use with the corresponding scanner module 23. The wrist mount unit 42 further includes a radio transmitter 49 for transmitting data to a remote unit (not shown). In contrast with the unit 41, which may include an integral battery unit, the unit 42 has a separate battery unit 46 which is arranged to provide power via a lead 47. The battery unit 46 may be worn by the user, either on another wrist mount 30 or attached to a belt or elsewhere on the user's clothing.

Turning now to FIG. 2, further details will be given of the way in which the scanner module 20 is mounted to the ring 10. As will be seen in FIG. 2, the releasable mounting 13 on the ring 11 includes a generally rigid base plate 50 to an upper surface of which is mounted a velcro covering 52. A corresponding velcro covering 54 is attached to the lower surface of the scanner module 20. The velcro mounting allows an appropriate scanner module to be rapidly mounted upon and removed from the band 12 when the band is in position on a user's finger. The mounting also acts as a breakaway element, allowing the module easily to break away from the ring mounting 12 to prevent possible damage to the scanner and/or injury to the user.

In the embodiment shown in FIG. 2, an adjustable clasp 56 provides for adjustability of the size of the band 12.

Instead of a velcro-type mount, the mount 13 may comprise an easily breakable mount or a clip-on mount which simply unclips if any undue pressure is applied.

Figure 3:
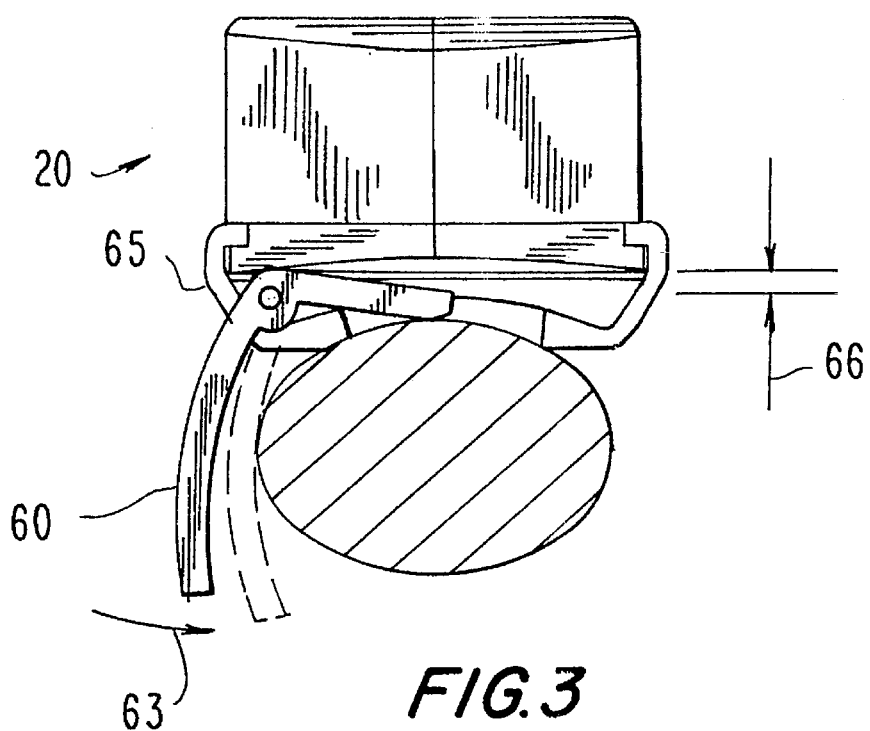
FIG. 3 is a cross-section corresponding to FIG. 2 illustrating the trigger switch.
Figure 4:
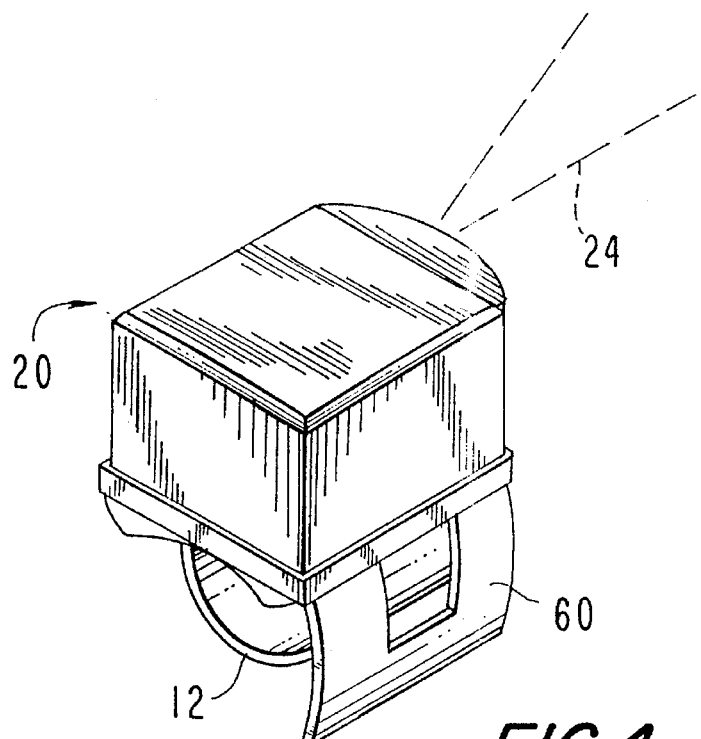
FIG. 4 is a more detailed perspective view of a ring-mounted optical scanner of the preferred embodiment.

As shown in FIGS. 3 and 4, the ring may further include a large trigger switch 60 designed for operation by the user's thumb pushing in the direction of the arrow 63 in FIG. 3. The trigger switch 60 is preferably of a relatively large size, as shown in FIG. 4, so that it may be easily operated by pressure at any point from the user's thumb. When compressed, a pivot point 65 of the switch compresses by an amount indicated by the arrows 66, thereby closing an electrical contact (not shown). The switch may be a several position switch, in which for example a first position actuates an aiming mode and a second position actuates a scanning mode.

Figure 5:
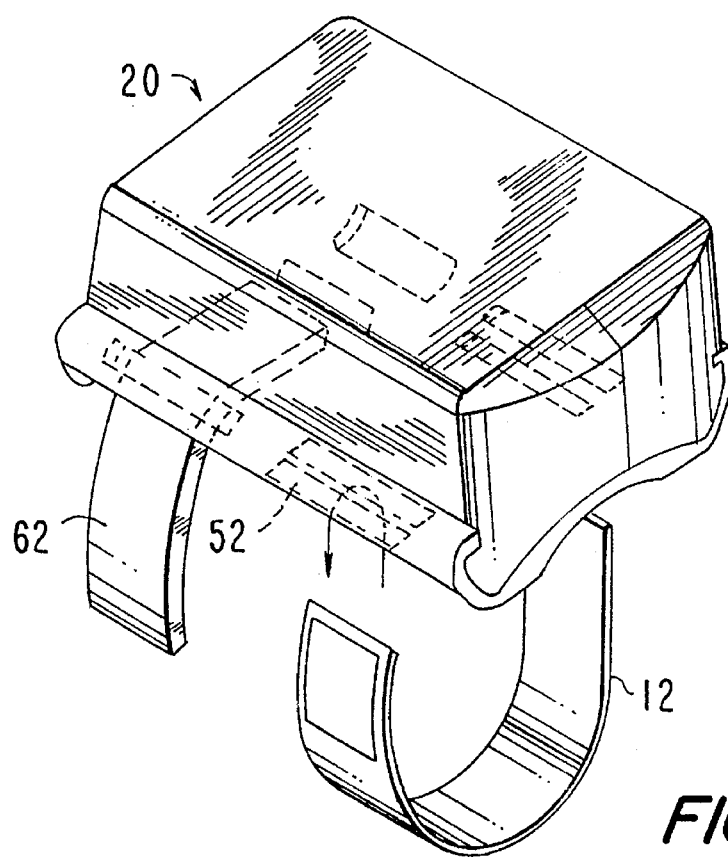
FIG. 5 shows an alternative embodiment.

FIG. 5 shows an alternative embodiment, incorporating a rather-smaller thumb-operated switch 62. In this embodiment, a clasp 52 is provided for the band 12, thereby enabling the size of the band to be adjusted for individual users.

It is clear that the invention is not limited to the specific embodiments shown, and that other embodiments and variations may occur to the skilled man which may fall within the scope of the overall inventive concept. The overall inventive concept is intended to encompass any one or more of the features described and/or illustrated, either individually or in any compatible combination.

We claim:

1. An optical scanner, comprising:
   (a) a ring having a band arranged to be worn on a finger of a user;
   (b) scanner module for directing light at indicia to be read, the scanner module being supported by the finger on which the band is worn; and
   (c) breakaway element operatively connected between the band and the scanner module, for releasably mounting and releasing the scanner module from the ring in the event of a force being applied to the module which might otherwise injure the user.

2. A scanner as claimed in claim 1 in which the breakaway element includes an easily breakable mount.

3. A scanner as claimed in claim 1 in which the breakaway element includes a clip-on mount.

4. A scanner as claimed in claim 1 in which the breakaway element includes a hook and loop fastener-type mount.

5. A scanner as claimed in claim 1 in which the scanner module includes a scanning element for scanning a beam across an indicia to be read.

6. A scanner as claimed in claim 1 in which the scanner module includes detection optics for receiving light reflected from an indicia to be read.

7. A scanner as claimed in claim 1 in which the band is adjustable in size.

8. A scanner as claimed in claim 1 in which the ring includes a switch for control of the scanner module.

9. A scanner as claimed in claim 8 in which the ring is arranged to be worn on the index finger of a user, the switch being operated by the user's thumb.

10. A scanner as claimed in claim 9 in which the switch includes a pressure-sensitive member, the member being spaced from the band and movable towards it when the member is pressed.

11. A scanner as claimed in claim 10 in which the pressure-sensitive member presents a relatively large area to the user's thumb compared with the area presented by the band.

12. A scanner as claimed in claim 1 in which the scanner module includes a cable for onward transmission of data.

13. A scanner as claimed in claim 1 in which the scanner module includes a radio transmitter for onward transmission of data.

14. A portable optical scanning system comprises:
   a) a ring having a band arranged to be worn on a finger of a user;
   b) a scanner module for directing light at indicia to be read, the scanner module being supported by the finger on which the band is worn, and for generating output signals representative of light received from the indicia to be scanned;
   c) a wrist-mounted unit for receiving the output signals from the scanner module; and
   d) a breakaway element operatively connected between the band and the scanner module, for releasably mounting and releasing the scanner module for the ring.

15. A scanning system as claimed in claim 14 in which the scanner module is coupled to the wrist-mounted unit by a cable for transmitting the output signals.

16. A scanning system as claimed in claim 14 in which the scanner module has a radio transmitter and the wrist-mounted unit a radio receiver, the output signals being transferred by radio transmission.

17. A scanning system as claimed in claim 14 in which the wrist-mounted unit incorporates an integral battery pack.

18. A scanning system as claimed in claim 14 including a separate battery pack for providing power to the wrist-mounted unit.

19. A scanning system as claimed in claim 14 in which the wrist-mounted unit is mounted to the user's wrist by a releasable wrist mount.

20. A scanning system as claimed in claim 14 including a plurality of separate, different scanner modules, one of which is chosen by the user according to the application.

21. A scanning system as claimed in claim 14 including a plurality of separate, different wrist-mounted units, one of which is chosen by the user according to the application.

22. A scanning system as claimed in claim 14 including a plurality of rings.

23. A scanning system as claimed in claim 19 including a plurality of wrist mounts.

24. A portable optical scanning system comprising:
   a) a plurality of rings arranged to be worn on the finger of a user;
   b) a plurality of different scanner modules, each of which is attachable to a chosen one of the rings via a breakaway element, and each of which is arranged to output signals representative of light received from an indicia to be scanned, said breakaway element being operatively connected between a module and its attached ring, for releasably mounting and releasing the respective scanner module from its attached ring; and
   c) a plurality of different wrist-mounted units for receiving the signals from a chosen one of the scanner modules.

25. A scanning system as claimed in claim 24 in which the rings have bands of differing sizes.

26. A scanning system as claimed in claim 24 including a plurality of releasable wrist mounts for mounting a selected one of the wrist-mounted units.

27. A scanning system as claimed in claim 26 in which the wrist mounts are of differing sizes.

* * * * *